(No Model.)
G. H. URBAN.
MEANS FOR ATTACHING HANDLES.
No. 489,170. Patented Jan. 3, 1893.
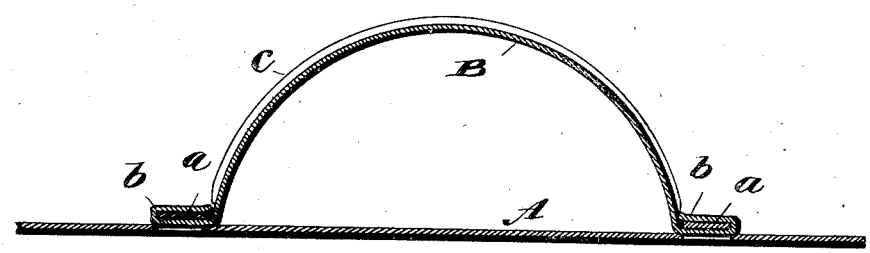
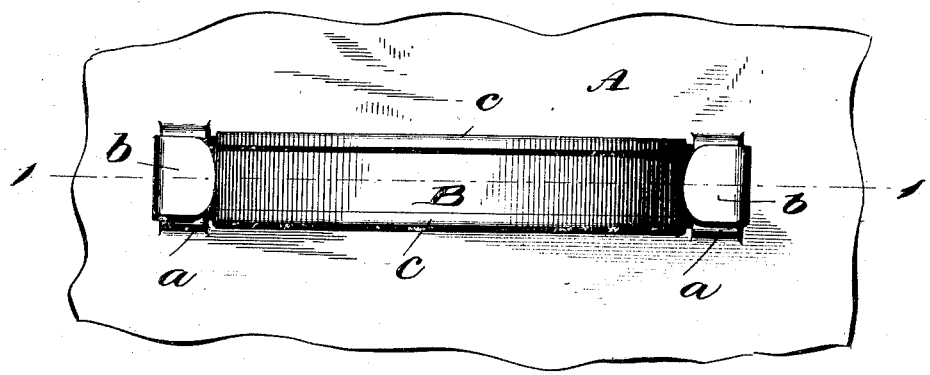
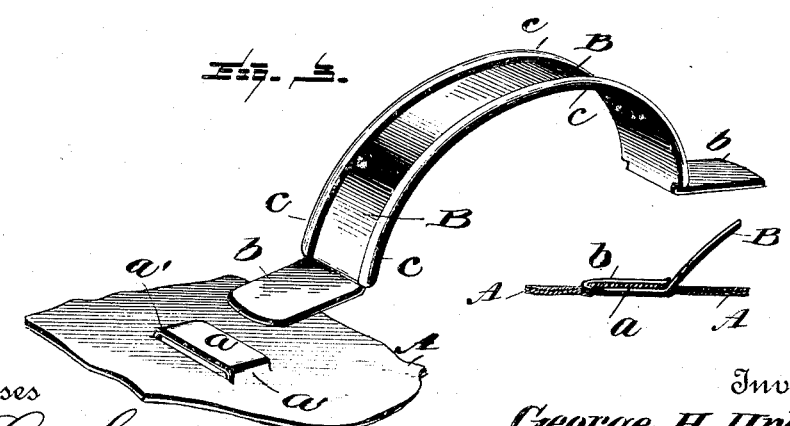
Witnesses
L. C. Hills.
E. H. Bond.
Inventor:
George H. Urban,
by E. B. Stocking
Attorney

UNITED STATES PATENT OFFICE.

GEORGE H. URBAN, OF BUFFALO, NEW YORK.

MEANS FOR ATTACHING HANDLES.

SPECIFICATION forming part of Letters Patent No. 489,170, dated January 3, 1893.

Application filed June 29, 1892. Serial No. 438,377. (No model.)

*To all whom it may concern:*

Be it known that I, GEORGE H. URBAN, a citizen of the United States, residing at Buffalo, in the county of Erie, State of New York, have invented certain new and useful Improvements in Means for Attaching Handles, of which the following is a specification, reference being had therein to the accompanying drawings.

This invention relates to certain new and useful improvements in covers and more particularly to the means for securing a handle thereto.

It has for its objects among others to provide a simple and cheap means of detachably affixing the handle so that it can be removed for nesting in shipping and easily applied by anyone when desired. The handle is formed with a tongue at each end which passes beneath a raised portion on the cover and is bent over upon the said raised portion. The raised portion is struck up from the metal of the cover and the end connecting portions prevent side movement of the tongue of the handle. I dispense with rivets, solder and all extraneous means for holding the handle to the cover.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which Figure 1 is a central section through the handle from end to end after it is applied to the cover a portion of which is also shown in section, the section being taken on the line 1 1 of Fig. 2, which is a top plan of the handle applied, showing also a portion of the cover. Fig. 3 is a perspective view of the handle detached and also a portion of the cover showing one of the raised portions.

Like letters of reference indicate like parts throughout the several views.

While the invention is shown as applied to pail or pot covers it will be understood that the invention is not restricted to its employment in such connection as it may be used elsewhere, as for instance upon tin cups and the like.

Referring now to the details of the drawings by letter, A designates a portion of a lid or cover, or it may be a portion of a side of a vessel to which it is desired to affix the handle. This portion A is formed with a raised portion $a$ formed by slitting the material upon parallel lines and then pressing the portion between the slits outward forming a space between the same and the material of the portion from which it is pressed, the raised portion being connected with the body at the ends by the portions $a'$ which form means for preventing undue lateral movement of the tongue on the handle.

B is the handle, it is formed with a tongue $b$ at each end, which tongue is of such a size as to practically fit the space between the end portions $a'$ of the raised portion and of sufficient length as to enable it to extend under the said raised portion, and to be bent upon itself upon the top of the raised portion as shown. The handle may have its edges turned or rolled to form a bead $c$ if desired and the roll or bead may be either upon the upper or lower side as may be preferred. The bead may be strengthened by a wire if desired. The bead terminates at the junction of the tongues with the body portion of the handle and forms stops to limit the movement of the tongue outward as will be best understood from Fig. 3.

In practice the handles may be nested as may also the covers, and when it is desired to affix the handle all that it is necessary to do is to place the tongues $b$ through the loops formed by the raised portions $a$ and then bend them back upon themselves and over the raised portions and compress them when they will be firmly and securely held in place without the employment of solder or any other extraneous means. They can be easily detached by a reversal of the steps above set forth.

What I claim as new is:—

1. A cover provided with a raised portion integral with said cover and a handle having a tongue inserted between said raised portion and the cover and bent over and upon and held to the raised portion, as set forth.

2. The combination with a cover having integral raised portion with end connecting portions, of a detachable cover having tongues adapted to be inserted through the loops formed by said raised portions and bent upon themselves and over the raised portions, as shown and described.

3. The combination with a cover having raised portions integral therewith and separated therefrom at the sides upon parallel lines, of a handle having integral tongues and with beads or rolls at the edges terminating at the junction of the tongues with the handle and forming shoulders as and for the purpose specified.

In testimony whereof I affix my signature in presence of two witnesses.

GEORGE H. URBAN.

Witnesses:
JOSEPH THRIES,
ANDREW KLEM.